No. 775,168. PATENTED NOV. 15, 1904.
J. B. GAUSSIRAN.
CANE OR CORN CUTTER.
APPLICATION FILED JAN. 8, 1904.
NO MODEL. 3 SHEETS—SHEET 1.

Witnesses
Inventor
J. B. Gaussiran
By
Wilkinson & Fisher
Attorneys

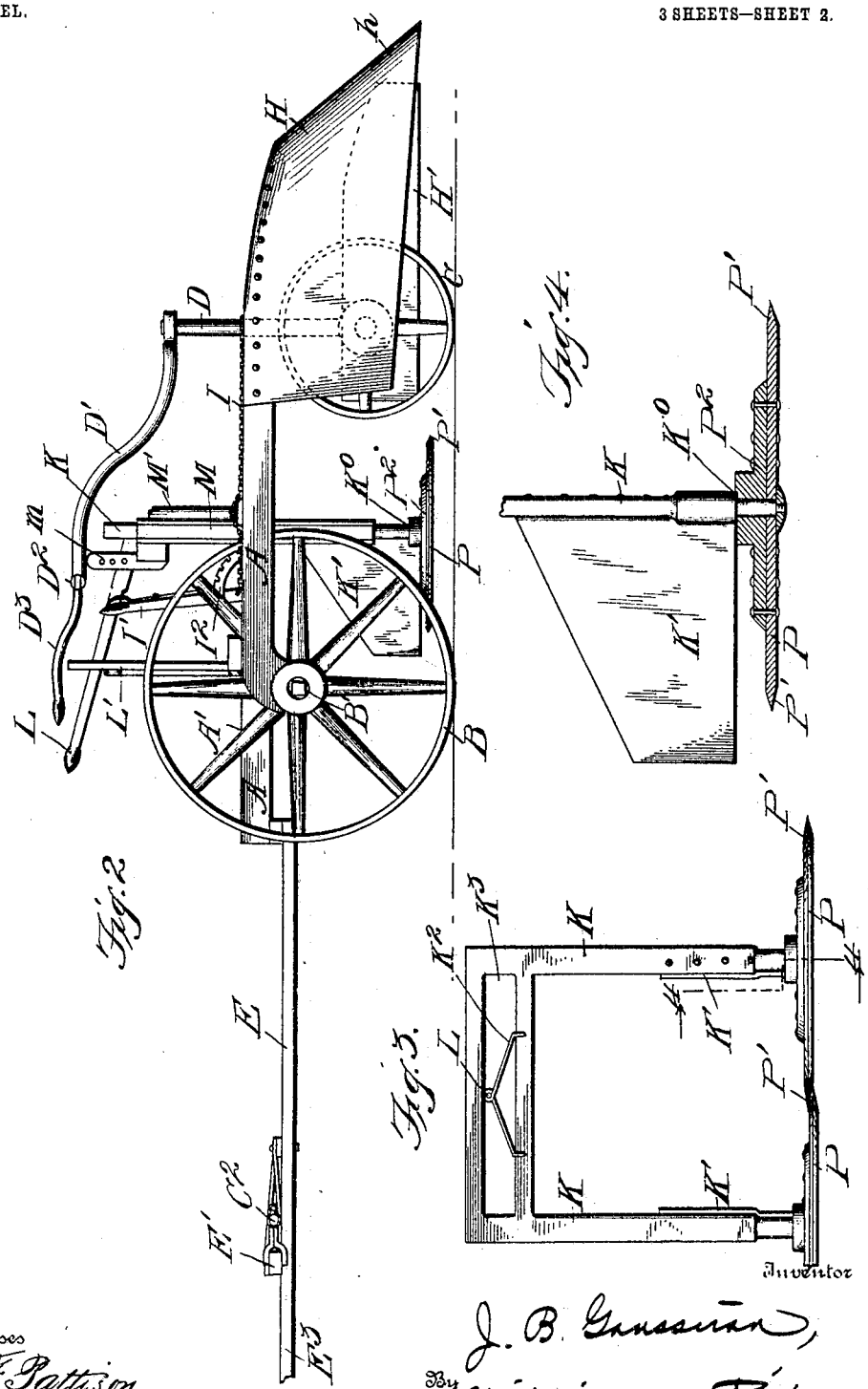

No. 775,168. Patented November 15, 1904.

UNITED STATES PATENT OFFICE.

JULES B. GAUSSIRAN, OF BALDWIN, LOUISIANA.

CANE OR CORN CUTTER.

SPECIFICATION forming part of Letters Patent No. 775,168, dated November 15, 1904.

Application filed January 8, 1904. Serial No. 188,213. (No model.)

*To all whom it may concern:*

Be it known that I, JULES B. GAUSSIRAN, a citizen of the United States, residing at Baldwin, in the parish of St. Mary and State of Louisiana, have invented certain new and useful Improvements in Cane or Corn Cutters; and I do hereby declare the following to be a full, clear, and exact description of the invention, such as will enable others skilled in the art to which it appertains to make and use the same.

My invention relates to improvements in machines for cutting cane, corn, sorghum, or other crops where it is desired to cut the stalks close to the ground and where the height at which the stalk is to be cut may be varied at will.

My invention is more particularly applicable to cutting sugar-cane, which varies largely in size and in stand and which is apt to be blown down and twisted.

My invention will be understood by reference to the accompanying drawings, in which the same parts are indicated by the same letters throughout the several views.

Figure 1:
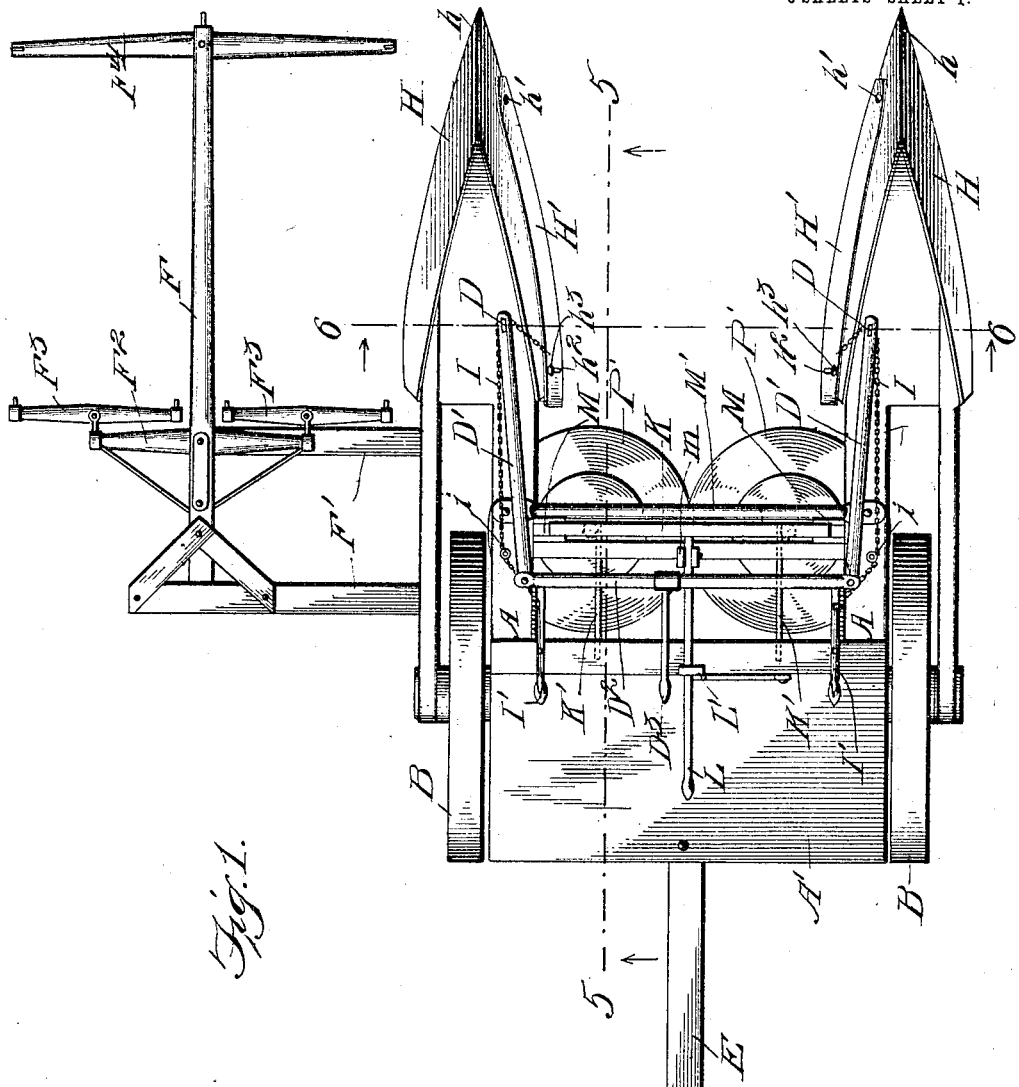
Figure 5:
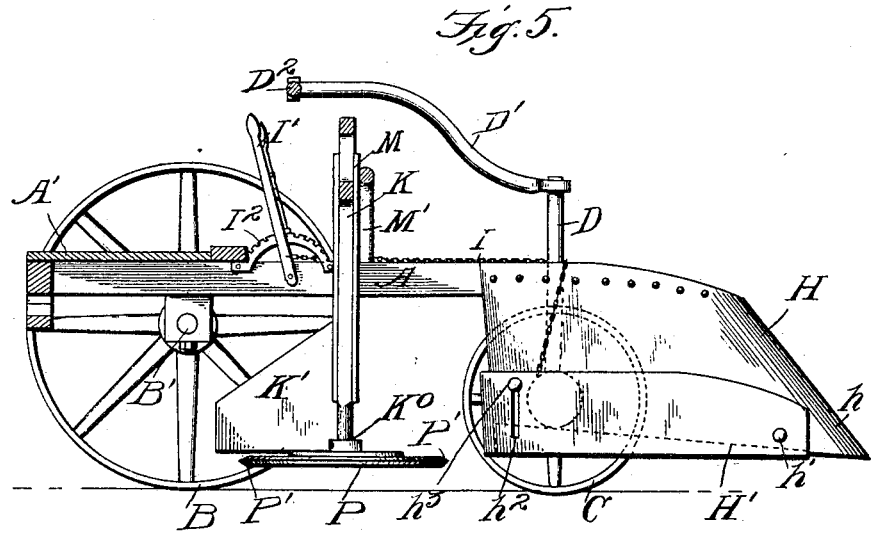
Figure 6:
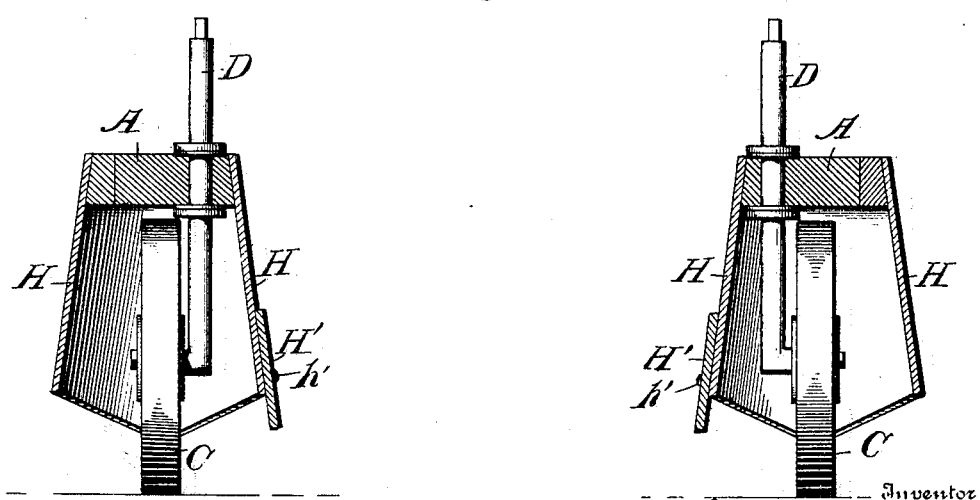

Figure 1 is a plan view of the machine, the driving-pole being broken away. Fig. 2 is a side elevation as seen from the right of Fig. 1. Fig. 3 is a detail showing the sliding frame carrying the rotary cutters. Fig. 4 shows a section along the broken line 4 4 of Fig. 3 and looking in the direction of the arrows. Fig. 5 shows a section along the line 5 5 of Fig. 1 and looking in the direction of the arrows; and Fig. 6 shows a section along the line 6 6 of Fig. 1 looking in the direction of the arrows, the wheels and spindles being shown in elevation.

A represents the framework of the machine, which is supported by the wheels B and C. On this frame A is mounted a platform A' for the operator. The wheels B are journaled on the axle B', and the distance between them should preferably be that between the rows of cane, corn, or other crop harvested, it being preferable, but not necessary, to have the wheels thus spaced apart the requisite distance, which for cane should be between six and seven feet.

The forward part of the frame A is supported upon the wheels C, which not only support this end of the frame, but also serve to guide the machine, as in turning headrows. These wheels (shown most clearly in Fig. 6) are mounted upon spindles D, which are connected by arms D' to the cross-tie D$^2$, which is controlled by the handle D$^3$. Thus it will be seen that these wheels C may be turned to the right or left, and thus the machine may be steered at will.

The machine may be driven by any suitable source of power; but it may be more convenient to drive the same by horse or mule power, and therefore I have shown means for applying such power in Fig. 1, in which E represents a pole carrying a cross-piece E', having swingletrees E$^2$ connected thereto, to which swingletrees the team is hooked up. It will be obvious that this pole E may be lengthened, as at E$^3$, and that a plurality of swingletrees may be connected thereto in rear of those shown in Fig. 1, if desired.

It will be seen that the motive power is applied from the rear, so that the animals will not be obliged to walk through the crop before it is harvested. In addition to the pole E an auxiliary pole F may be used, connected by a suitable frame F' to the body of the machine, as shown in Fig. 1, and to this pole the doubletrees F$^2$ and F$^4$ and the swingletrees F$^3$ may be attached. When using this auxiliary pole, it will be necessary to first cut a row of the standing crop on the left side of the machine, so that the animals may be able to proceed unimpeded.

On the front end of the frame A, I provide two shoes or plows H, which are constructed to incase and protect the steering-wheels C and to pass into the trough between the rows of the cane or corn to pick up any stalks that may have fallen down. These plows have tapering points *h*, which project down into the trough between the beds of the cane or corn and wedge the fallen stalks up, while the said shoes direct the said stalks into the throat between the rotary cutting-blades, which will be hereinafter described. On the inner side of these shoes I provide pivoted shields H', which are pivoted to said shoes, as at $h'$, and are slotted, as at $h^2$, to engage the pins $h^3$, and these shields may be raised or lowered by means of the chains I and levers $I'$, which levers are provided with pawls engaging the racks $I^2$. The purpose of these shields is to project down into the hollow or trough between the rows when desired and prevent any of the stalks from passing beneath the shoes H.

The cane is cut by means of rotary cutters which need have no proper motion of their own, being rotated by their engagement with the stalks. These cutters (indicated at P) preferably comprise a removable circular cutting-blade $P'$, secured to a stiff sleeve or backing $P^2$. (See Fig. 4.) By having this blade removable it may be detached and sharpened when desired or another blade put on. These blades are journaled on the spindle $K^0$, carried by the frame K, (see Figs. 3 and 4,) which frame may be raised or lowered by the operator on the platform $A'$ by means of the lever L, which may engage in the yoke $K^2$ or may project into the slot $K^3$ in the upper part of said frame K, as shown in Fig. 3. Projecting rearward from said frame I provide guard-plates $K'$, which keep the stalks and trash from spreading outward; but these guards $K'$ may be omitted, if desired. The purpose of the lever L is to raise and lower the said frame K, and with it the cutting-blades, so that these blades may be raised or lowered according to the height of the rows or to avoid obstacles, according to the will of the operator, who stands on the platform $A'$. The frame K is mounted in a suitable guideway—such, for instance, as that indicated at M—and any suitable braces, such as $M'$, may be used, if desired.

The lever L, by means of which the frame K is raised or lowered, is pivoted in the arm $m$, which may be provided with a plurality of pivot-holes, as shown in Fig. 2, whereby the vertical movement of the frame K may be varied, if desired.

The lever L is adapted to engage any suitable stop, such as $L'$, so that the cutting-blades may be retained at any desired height.

It will be obvious that a great many modifications might be made in the herein-described apparatus which could be used without departing from the spirit of my invention.

Having thus described my invention, what I claim, and desire to secure by Letters Patent of the United States, is—

1. In a machine of the character described, having a stalk-passage, the combination with cutting-blades in said passage, of a pair of shoes on opposite sides of said passage, means for preventing the stalks being cut from passing beneath said shoes, comprising shields secured to the inner faces thereof, and means for altering the position of said shields, substantially as described.

2. In a machine of the character described having a stalk-passage, the combination with rotary cutting-blades in said passage, of a pair of tapered shoes on opposite sides of said passage, means for preventing the stalks being cut from passing beneath said shoes comprising pivoted shields carried by said shoes on the inner faces thereof, and means for swinging said shields about their pivots, substantially as described.

3. In a machine of the character described having a stalk-passage, the combination with cutting-blades in said passage, of a pair of tapered shoes on opposite sides of said passage, means for preventing the stalks being cut from passing beneath said shoes comprising pivoted shields carried by said shoes on the inner faces thereof, and means for swinging said shields about their pivots, substantially as described.

4. In a machine of the character described having a stalk-passage, the combination with cutting-blades in said passage, of a pair of tapered shoes on opposite sides of said passage, means for preventing the stalks being cut from passing beneath said shoes, comprising pivoted shields carried by said shoes on the inner faces thereof, and a lever and chains for swinging said shields about their pivots, substantially as described.

5. In a machine of the character described having a stalk-passage, the combination with cutting-blades in said passage, provided with hand-operated raising and lowering means, of a pair of shoes on opposite sides of said passage, means for preventing the stalks being cut from passing beneath said shoes, comprising shields secured to the inner faces thereof, and means for altering the position of said shields, substantially as described.

6. In a machine of the character described having a stalk-passage, the combination with rotary cutting-blades in said passage, of a pair of tapered shoes on opposite sides of said passage, means for preventing the stalks being cut from passing beneath said shoes, comprising pivoted shields carried by said shoes on the inner faces thereof, and levers and chains for swinging said shields about their pivots, substantially as described.

7. In a machine of the character described having a stalk-passage, the combination with cutting-blades in said passage, of a pair of tapered shoes on opposite sides of said passage, means for preventing the stalks being cut from passing beneath said shoes, comprising pivoted shields carried by said shoes on the inner faces thereof, and hand-operated means for swinging said shields about their pivots, substantially as described.

8. In a machine of the character described having a stalk-passage, the combination with a secondary frame carried by the main frame provided with a hand-lever for raising and lowering the same, of a pair of tapered shoes on opposite sides of said passage, means for preventing the crop being cut from passing beneath said shoes, comprising pivoted shields carried by said shoes, and levers and chains for swinging said shields about their pivots, substantially as described.

9. In a machine of the character described, having main and steering wheels and a stalk-passage therebetween, the combination with rotary cutting-blades in said passage provided with means for raising and lowering the same, of a pair of shoes on opposite sides of said passage constructed to incase and protect said steering-wheels, substantially as described.

10. In a machine of the character described having main and steering wheels and a stalk-passage therebetween, the combination with rotary cutting-blades in said passage, of a pair of tapered shoes on opposite sides of said passage, means for preventing the crop being cut from passing beneath said shoes comprising pivoted shields carried by said shoes on the inner faces thereof, and means for swinging said shields about their pivots, substantially as described.

11. In a machine of the character described having main and steering wheels and a stalk-passage therebetween, the combination with cutting-blades in said passage, of a pair of tapered shoes on opposite sides of said passage, means for preventing the crop being cut from passing beneath said shoes comprising pivoted shields carried by said shoes on the inner faces thereof, and means for swinging said shields about their pivots, substantially as described.

12. In a machine of the character described, the combination with a main frame and the main wheels and steering-wheels, of shoes carried by said frame constructed to incase and protect said steering-wheels, a secondary frame with means for moving the same vertically carried by the main frame, and cutters carried by the secondary frame, substantially as described.

13. In a machine of the character described, the combination with a main frame, and the main wheels and steering-wheels, of shoes carried by said frame constructed to incase and protect said steering-wheels, a secondary frame with means for moving the same vertically carried by the main frame, a hand-lever connected to said secondary frame for raising and lowering the same, and cutters carried by the secondary frame, substantially as described.

14. In a machine of the character described having main and steering wheels and a stalk-passage therebetween, the combination with cutting-blades in said passage, of a pair of tapered shoes on opposite sides of said passage, means for preventing the crop being cut from passing beneath said shoes, comprising pivoted shields carried by said shoes, and a lever and chains for swinging said shields about their pivots, substantially as described.

15. In a machine of the character described having main and steering wheels, and a stalk-passage therebetween, the combination with rotary cutting-blades in said passage, provided with means for raising and lowering the same, of a pair of shoes on opposite sides of said passage constructed to incase and protect said steering-wheels, and arms and a handle for controlling said steering-wheels, substantially as described.

16. In a machine of the character described having main and steering wheels and a stalk-passage therebetween, the combination with rotary cutting-blades in said passage provided with means for raising and lowering the same, of a pair of tapered shoes on opposite sides of said passage, means for preventing the stalks being cut from passing beneath said shoes, comprising pivoted shields carried by said shoes, and means for swinging said shields about their pivots, substantially as described.

17. In a machine of the character described having main and steering wheels and a stalk-passage therebetween, the combination with cutting-blades in said passage, of a pair of tapered shoes on opposite sides in said passage constructed to incase and protect said steering-wheels, pivoted shields carried by said shoes, means for swinging said shields about their pivots, and arms, a cross-piece, and handle for controlling said steering-wheels, substantially as described.

18. In a machine of the character described, the combination with a main frame, and the main wheels and steering-wheels, of shoes carried by said frame constructed to incase and protect said steering-wheels, with arms, a cross-piece, and handle for controlling said steering-wheels, a secondary frame, with means for moving the same vertically carried by the main frame, and cutters carried by the secondary frame, substantially as described.

19. In a machine of the character described, the combination with a main frame, and the main wheels and steering-wheels, with arms, a cross-piece, and handle for controlling said steering-wheels, of shoes carried by said frame constructed to incase and protect said steering-wheels, a secondary frame with means for moving the same vertically carried by the main frame, a hand-lever connected to said secondary frame for raising and lowering the same, and cutters carried by the secondary frame, substantially as described.

20. In a machine of the character described having main and steering wheels and a stalk-passage therebetween, the combination with cutting-blades in said passage, of a pair of tapered shoes on opposite sides of said passage, means for preventing the stalks being cut from passing beneath said shoes comprising pivoted shields carried by said shoes on the inner faces thereof, a lever and chains for swinging said shields about their pivots, and arms, a cross-piece, and handle for controlling said steering-wheels, substantially as described.

In testimony whereof I affix my signature in presence of two witnesses.

JULES B. GAUSSIRAN.

Witnesses:
 WILLIAM GILMAN,
 EMMET ALPHA.